United States Patent [19]

Peecher

[11] 4,117,262

[45] Sep. 26, 1978

[54] SOUND COMMUNICATION SYSTEM

[75] Inventor: Ronald Kaye Peecher, Huntsville, Ala.

[73] Assignee: International Telephone and Telegraph Corp., New York, N.Y.

[21] Appl. No.: 833,972

[22] Filed: Sep. 16, 1977

[51] Int. Cl.² .............................................. H04B 1/40

[52] U.S. Cl. .............................. 179/1 SW; 179/1 VE

[58] Field of Search ................ 179/1 SW, 1 VE, 1 C, 179/2 C, 2 E, 2 EA, 2 EC, 1 A, 1 MG; 325/18, 22

[56] References Cited

U.S. PATENT DOCUMENTS

| | | | |
|---|---|---|---|
| 2,572,221 | 10/1951 | Voight | 179/1 VE |
| 3,795,769 | 3/1974 | Nowka et al. | 179/1 SW |
| 3,938,043 | 2/1976 | Desai | 179/1 SW |
| 4,027,249 | 5/1977 | Calman | 179/1 VE |
| 4,035,589 | 7/1977 | Parke | 179/1 VE |

*Primary Examiner*—Kathleen H. Claffy
*Assistant Examiner*—Gerald L. Brigance
*Attorney, Agent, or Firm*—A. Donald Stolzy

[57] ABSTRACT

A system for combining a two-way radio, a siren for broadcast of plural siren sounds, a loudspeaker, a public address system, and a single microphone for both radio and public address use into an integrated sound communication system for use in an emergency vehicle or the like is disclosed, including a logic circuit for overriding all other communication modes when the system is placed in a public address mode.

4 Claims, 14 Drawing Figures

FIG. 6
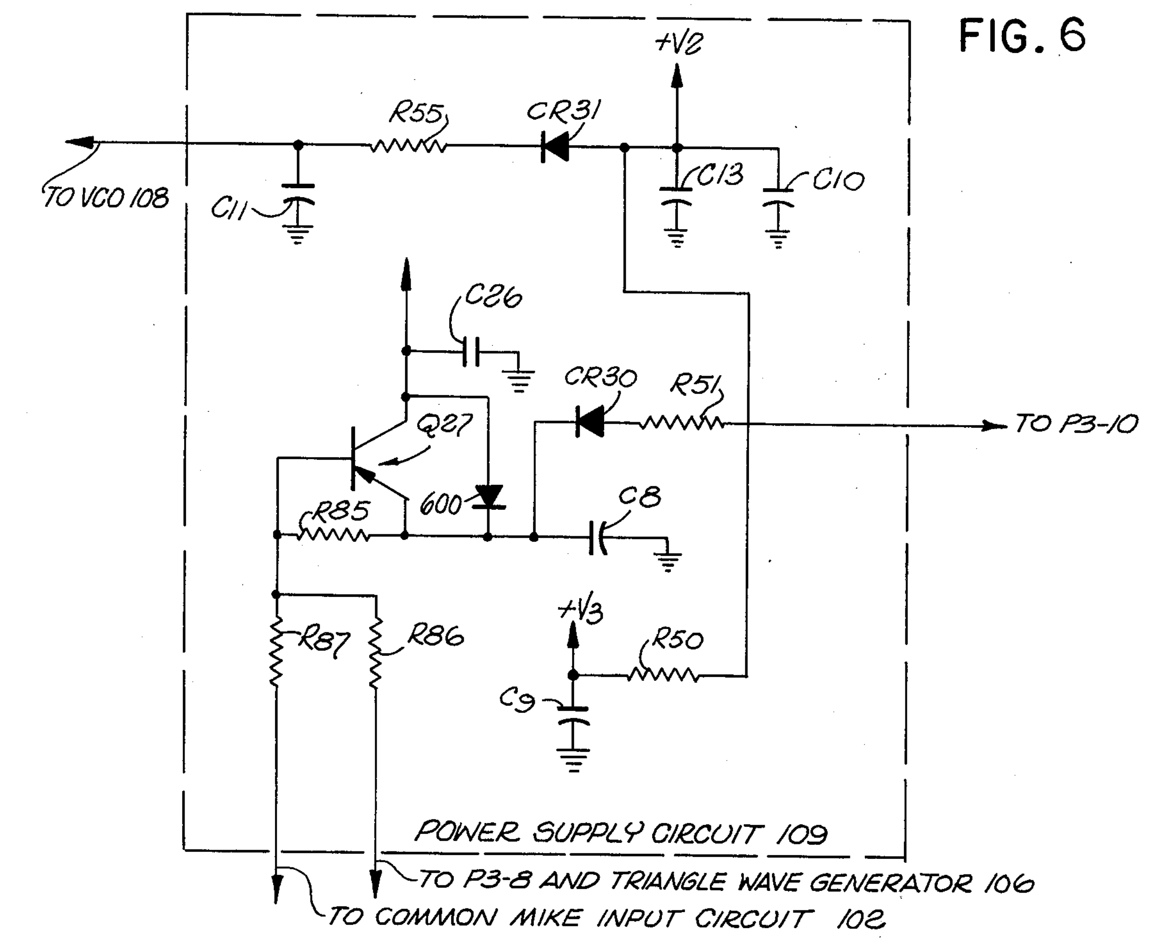
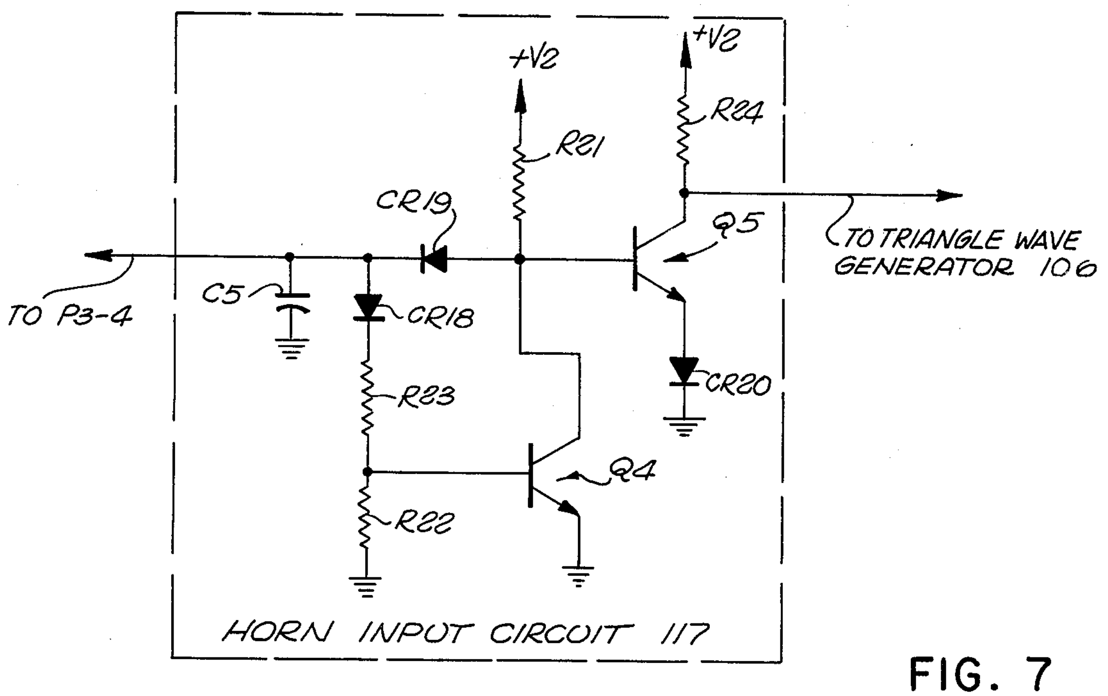
FIG. 7

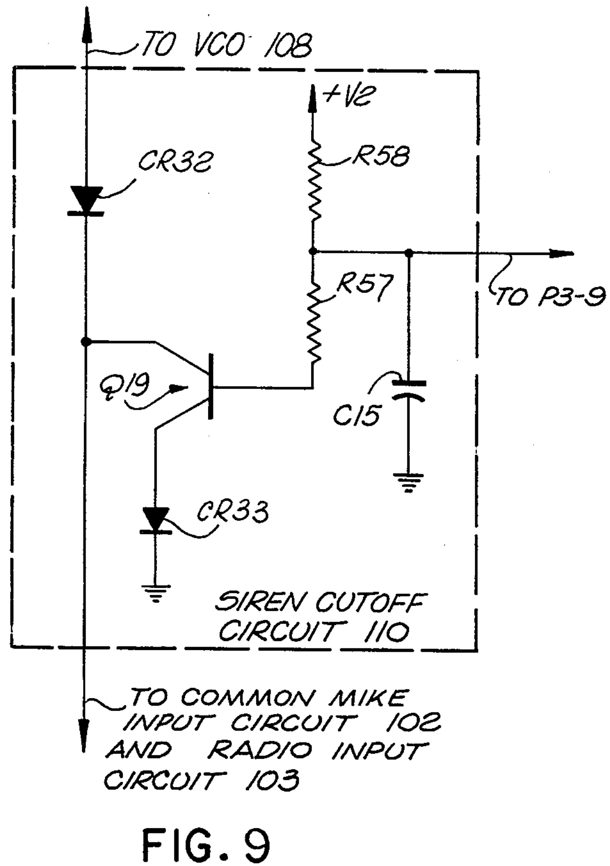
FIG. 9
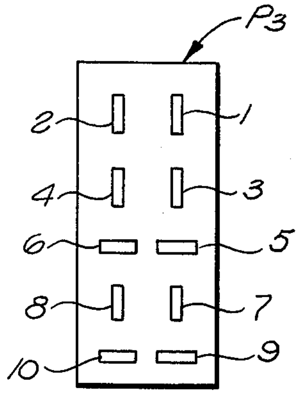
FIG. 10
FIG. 11
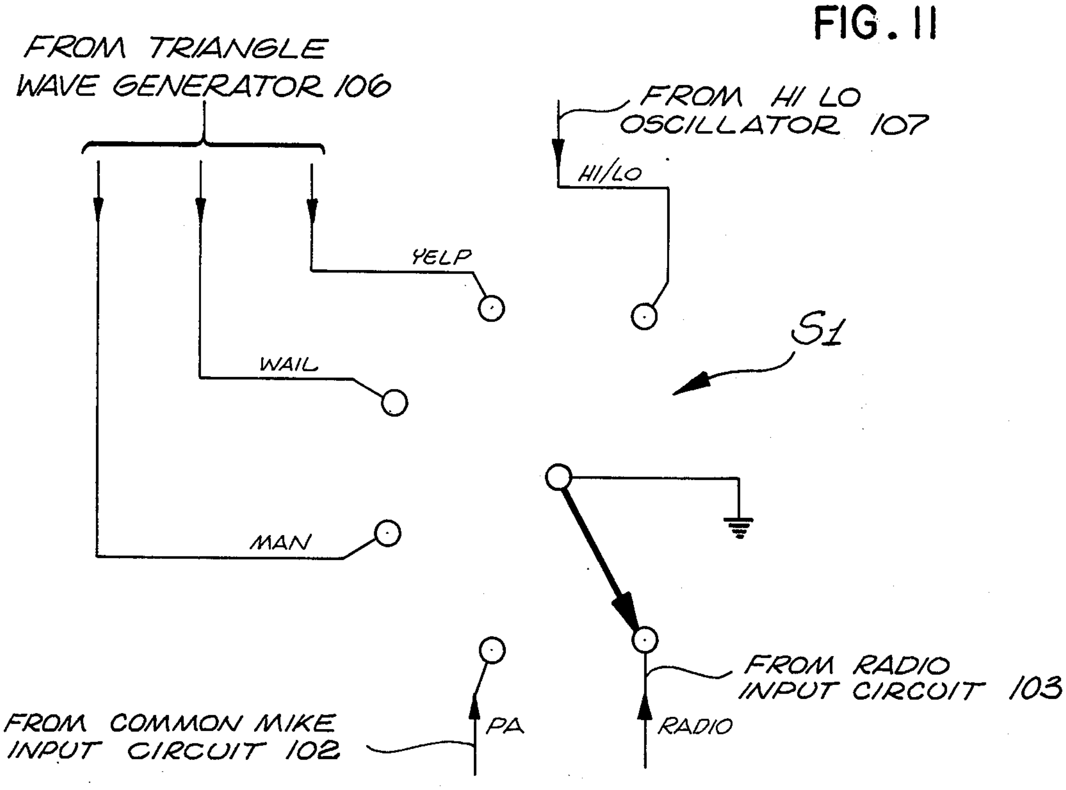

SOUND COMMUNICATION SYSTEM

BACKGROUND OF THE INVENTION

This invention relates to audio devices, and more particularly to a system including a set of electronic switches and a logic circuit which may be employed to make use of a single microphone for RF transmission and public address while also making use of a siren loudspeaker on an emergency vehicle.

Many switches with many contacts have been required in prior art siren systems.

SUMMARY OF THE INVENTION

The above-described and other disadvantages of the prior art are overcome in accordance with the present invention by providing a sound communication system, said system comprising: a first switch having a pole and at least first and second contacts for public address (PA) and siren modes of operation, respectively, said first switch pole being maintained at a predetermined potential; a voltage controlled oscillator (VCO) having a signal input, a disable input and an output; first means connected from said first switch second contact to said VCO input to modulate the VCO output frequency; a loudspeaker; second means having an input and an output, said second means input being connected from said VCO output, said second means output being connected to said loudspeaker, said second means causing said loudspeaker to broadcast audio signals of frequencies and amplitudes proportional to those existing at the output of said VCO; a two-way radio having two microphone inputs and two speaker outputs, a second switch having first, second and third ganged poles alternately engageable with corresponding radio contacts and PA contacts; a microphone having first and second leads; first and second electronic switches both connected from said first lead to said first pole and the PA contact thereof, respectively; a third electronic switch connected from said second lead to said second pole; third means connected from said first pole PA contact to said second means for operating said loudspeaker from said microphone in a PA mode; a microphone switch; a radio input circuit including a fourth electronic switch connected from said two radio speaker outputs to said second means input; a logic circuit connected from one of said third pole contacts, from said microphone switch, and from said first switch first contact, corresponding radio contacts of said first and second poles being connected to the microphone inputs of said radio, said first switch first contact being a PA contact, said logic circuit causing said loudspeaker to operate in the said PA mode when one of the poles of said first and second switches engages a PA contact.

BRIEF DESCRIPTION OF THE DRAWINGS

In the accompanying drawings which illustrate an exemplary embodiment of the present invention:

FIG. 6 is a schematic diagram of a power supply circuit shown in FIG. 1;

FIG. 7 is a schematic diagram of a horn input circuit shown in FIG. 1;

FIG. 9 is a schematic diagram of a siren cutoff circuit shown in FIG. 1;

FIG. 10 is an end elevational view of a plug employed with a socket shown in the switching circuit of FIG. 2;

FIG. 11 is a schematic diagram of a single-pole, multiple-throw switch shown in FIG. 1;

DESCRIPTION OF THE PREFERRED EMBODIMENT

Figure 1:
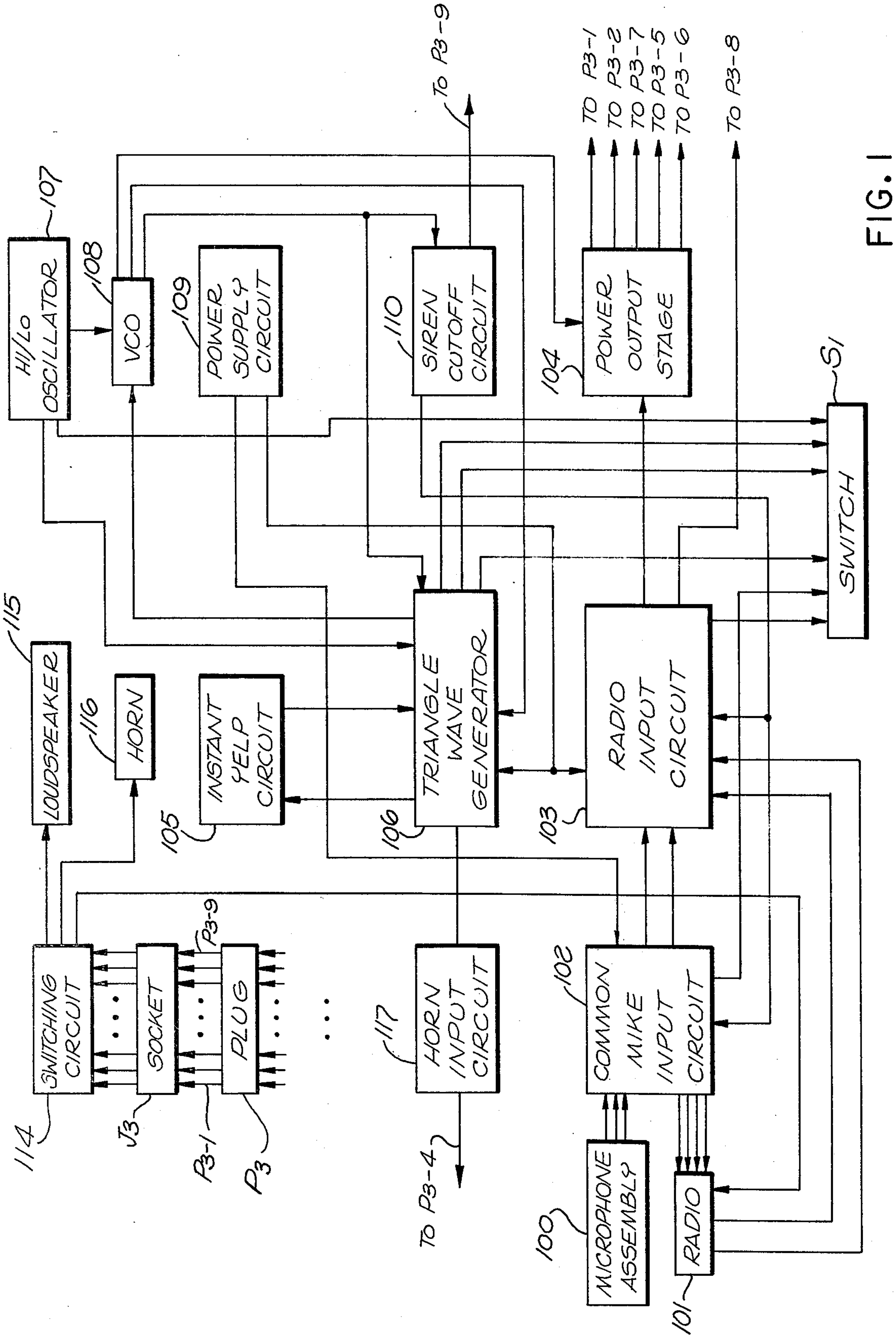
FIG. 1 is a block diagram of a system constructed in accordance with the present invention.

For convenience, the nomenclature of each figure is set forth below.

FIG. 1

| Structure | Reference Character |
|---|---|
| Common mike input circuit | 102 |
| HI/LO oscillator | 107 |
| Horn | 116 |
| Horn input circuit | 117 |
| Instant YELP circuit | 105 |
| Loudspeaker | 115 |
| Manual switch | S1 |
| Microphone assembly | 100 |
| Pin | P3-1 |
| Pin | P3-2 |
| Pin | P3-3 |
| Pin | P3-4 |
| Pin | P3-5 |
| Pin | P3-6 |
| Pin | P3-7 |
| Pin | P3-8 |
| Pin | P3-9 |
| Plug | P3 |
| Power output stage | 104 |
| Power supply circuit | 109 |
| Radio | 101 |
| Radio input circuit | 103 |
| Siren cutoff circuit | 110 |
| Socket | J3 |
| Switching circuit | 114 |
| Triangle wave generator | 106 |
| VCO | 108 |

FIG. 2

| | |
|---|---|
| Diode | CR3 |
| Circuit breaker | 202 |
| Diode | 200 |
| Diode | 201 |
| Manual switch | S2 |
| Relay | K1 |
| Socket | J3 |
| Switch | 203 |
| Switch | 204 |
| Switch (Opens when vehicle door opens) | 205 |
| Terminal board | TB1 |

FIG. 3

| Structure | Reference Character |
|---|---|
| Capacitor | C12 |
| Capacitor | C14 |
| Diode | CR21 |
| Diode | CR22 |
| Diode | CR23 |
| Flip-flop | 302 |
| Inverter | 300 |
| Inverter | 301 |

FIG. 3-continued

| Structure | Reference Character |
| --- | --- |
| Resistor | R53 |
| Resistor | R54 |
| Resistor | R56 |
| Switch | 303 |

FIG. 4

| | |
| --- | --- |
| Capacitor | C7 |
| Programmable unijunction transistor (PUT) | Q14 |
| Resistors | R32 through R39, and R47 |
| Transistor | Q13 |
| Transistor | Q15 |

FIG. 5

| | |
| --- | --- |
| Capacitors | C16 through C18 |
| Diodes | CR34 through CR39 |
| Potentiometer | R60 |
| Resistors | R61 through R67 |
| Transistors | Q16 through Q18 |

FIG. 6

| Structure | Reference Character |
| --- | --- |
| Capacitor | C8 |
| Capacitor | C9 |
| Capacitor | C10 |
| Capacitor | C11 |
| Capacitor | C13 |
| Capacitor | C26 |
| Diode | CR30 |
| Diode | CR31 |
| Diode | 600 |
| Resistor | R50 |
| Resistor | R51 |
| Resistor | R55 |
| Resistor | R85 |
| Resistor | R86 |
| Resistor | R87 |
| Transistor | Q27 |

FIG. 7

| | |
| --- | --- |
| Capacitor | C5 |
| Diode | CR18 |
| Diode | CR19 |
| Diode | CR20 |
| Resistor | R21 |
| Resistor | R22 |
| Resistor | R23 |
| Resistor | R24 |
| Transistor | Q4 |
| Transistor | Q5 |

FIG. 8

| Structure | Reference Character |
| --- | --- |
| Capacitor | C6 |
| Capacitor | 802 |
| Diode | CR24 |
| Diode | CR25 |
| Diode | CR26 |
| Diode | CR27 |
| Diode | CR29 |
| Diode | CR43 |
| Diode | CR44 |
| Diode | 800 |
| Diode | 804 |
| Diode | 805 |
| Resistor | R25 |
| Resistor | R26 |
| Resistor | R29 |
| Resistor | R30 |
| Resistor | R31 |
| Resistor | R40 |
| Resistor | R41 |
| Resistor | R42 |
| Resistor | R43 |
| Resistor | R44 |
| Resistor | R45 |
| Resistor | R46 |
| Resistor | R49 |

FIG. 8-continued

| Structure | Reference Character |
| --- | --- |
| Resistor | R52 |
| Resistor | R48 |
| Switch | 801 |
| Transistor | Q6 |
| Transistor | Q7 |
| Transistor | Q8 |
| Transistor | Q9 |
| Transistor | Q10 |
| Transistor | Q11 |
| Transistor | Q12 |
| Transistor | 803 |

FIG. 9

| | |
| --- | --- |
| Capacitor | C15 |
| Diode | CR32 |
| Diode | CR33 |
| Resistor | R57 |
| Resistor | R58 |
| Transistor | Q19 |

FIG. 10

| | |
| --- | --- |
| Plug | P3 |

FIG. 11

| | |
| --- | --- |
| Switch | S1 |

FIG. 12

| Structure | Reference Character |
| --- | --- |
| Capacitor | C3 |
| Diode | CR6 |
| Diode | CR7 |
| Diode | CR8 |
| Diode | CR9 |
| Diode | CR10 |
| Diode | CR11 |
| Diode | CR12 |
| Diode | CR13 |
| Diode | CR14 |
| Diode | CR15 |
| Diode | CR16 |
| Diode | CR17 |
| Diode | CR42 |
| Electronic switch | 1202 |
| Electronic switch | 1203 |
| Electronic switch | 1204 |
| Inverter | 1210 |
| Inverter | 1211 |
| Manual switch | S3 |
| Microphone | 1200 |
| NAND gate | 1209 |
| NOR gate | 1205 |
| NOR gate | 1206 |
| NOR gate | 1207 |
| NOR gate | 1208 |
| Resistor | R11 |
| Resistor | R13 |
| Resistor | R14 |
| Resistor | R15 |
| Resistor | R16 |
| Resistor | R17 |
| Resistor | R18 |
| Resistor | R19 |
| Resistor | R80 |
| Resistor | R81 |
| Resistor | R82 |
| Resistor | R83 |
| Resistor | R84 |
| Resistor | R978 |
| Switch | 1201 |
| Transistor | Q1 |
| Transistor | Q2 |
| Transistor | Q25 |
| Transistor | Q26 |

FIG. 13

| | |
| --- | --- |
| Capacitor | C1 |
| Capacitor | C2 |
| Capacitor | C27 |
| Capacitor | 1301 |

FIG. 13-continued

| | |
|---|---|
| Diode | CR1 |
| Diode | CR2 |
| Diode | CR4 |
| Diode | CR5 |
| Electronic switch | 1300 |
| Potentiometer | R1 |
| Resistor | R2 |
| Resistor | R3 |
| Resistor | R4 |
| Resistor | R5 |
| Resistor | R6 |
| Resistor | R7 |
| Resistor | R8 |
| Resistor | R9 |
| Resistor | R12 |
| Transformer | T1 |
| Transistor | Q3 |

FIG. 14

| | |
|---|---|
| Capacitors | C19 through C25 |
| Diode | CR40 |
| Diode | CR41 |
| Resistor | R68 |
| Resistor | 69 |
| Transformer | T2 |
| Transformer | T3 |
| Transformer | T4 |
| Resistor | R70 |
| Resistor | R71 |
| Resistor | R72 |
| Resistor | R73 |
| Resistor | R74 |
| Resistor | R75 |
| Resistor | R76 |
| Resistor | R77 |
| Resistor | R79 |
| Thermistor | R78 |

In FIG. 1, various circuits have inputs or outputs connected to certain pins P3-1 . . . P3-10 of plug P3. A pin P3-3 connection is not employed. However, connections from certain circuits are shown. For example, circuit 110 has an output to pin P3-9. Hereinafter, each of the pins P3-1 . . . P3-10 will be referred to simply as P3-1 . . . P3-10 without the word "pin" appearing before the "P" in each reference character.

Again, power output stage 104 in FIG. 1 has five outputs to P3-1, P3-2, P3-7, P3-5 and P3-6. Radio input circuit 103 also has an output to P3-8.

Figure 2:
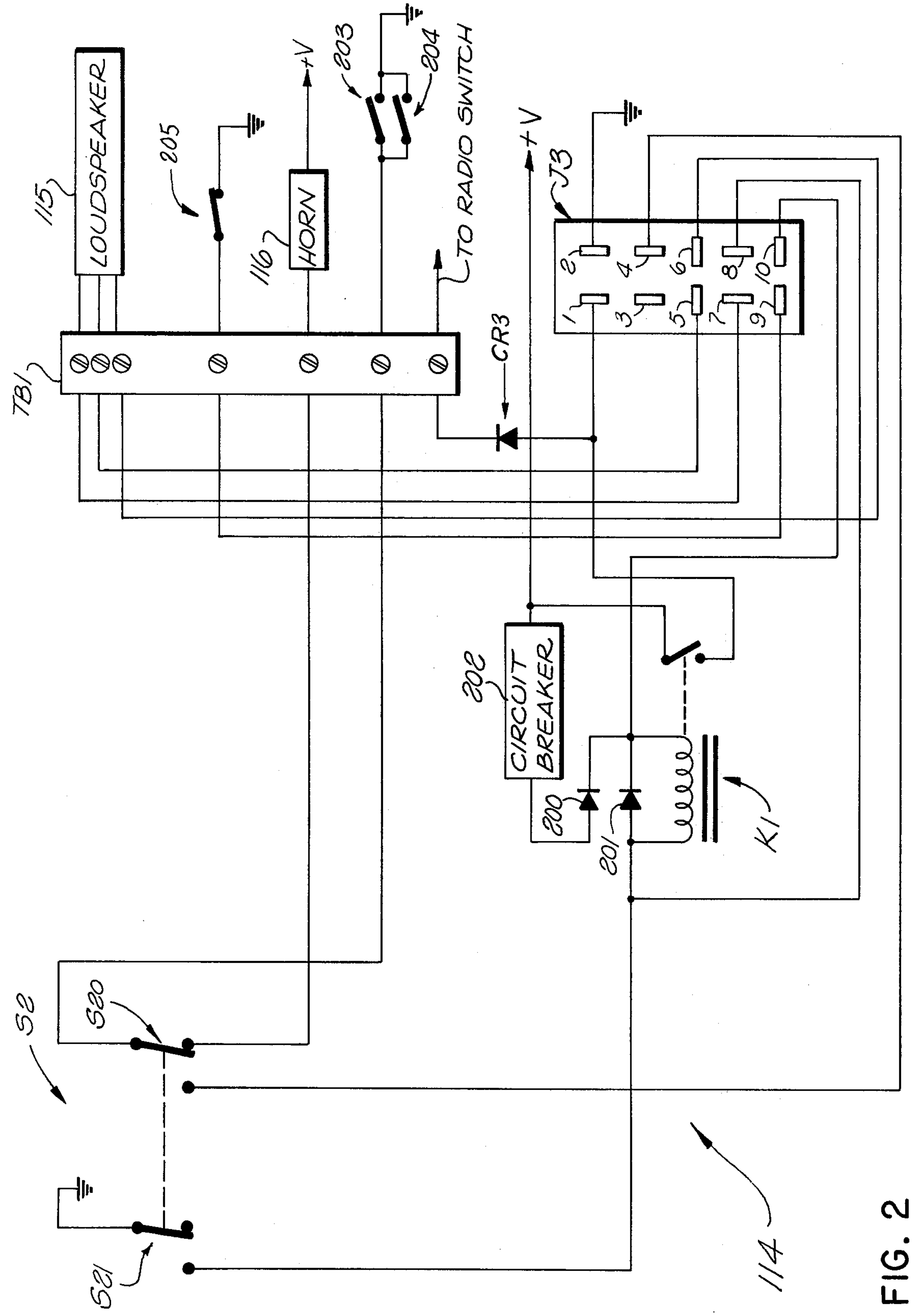
FIG. 2 is a schematic diagram of a switching circuit shown in FIG. 1.

Although they are not shown, switching circuit 114 shown in FIGS. 1 and 2 may have additional leads and switches, not shown, ganged with switch S2 to provide for lights, for example, on the exterior of an emergency vehicle.

In general, switch S2 turns the siren on and off. Switch S2 includes a single-pole, double-throw switch S20 and a single-pole, double-throw switch S21 which are ganged together. The switch S20 makes it possible to use the steering wheel horn selectively when the siren is turned off. The ring on the horn is maintained at ground as indicated on the right-hand sides of switches 203 and 204. Switch 203 may be the horn ring switch. Switch 204 may be a foot switch, if desired.

In other words, when the siren is turned off by moving switch S2 in FIG. 2 to the position shown, the horn 116 is operated in a conventional manner. When switch S2 is moved to the opposite position, the siren is actuated.

Power output stage 104 in FIG. 1 simply supplies power through plug P3, socket J3 and switching circuit 114 to loudspeaker 115 and horn 116, and operates radio 101 via P3-1.

In FIG. 7, if P3-4 is grounded by depressing the horn ring switch 203 (FIG. 2), the horn input circuit 117 will be activated. A positive signal applied will activate diode CR18 and turn on transistor Q4. This will turn off transistor Q5. This will cause the output of the horn input circuit to go to +12 volts. When P3-4 is grounded, diode CR19 will be forward biased. This turns off Q5, providing an output of +12 volts.

Figure 3:
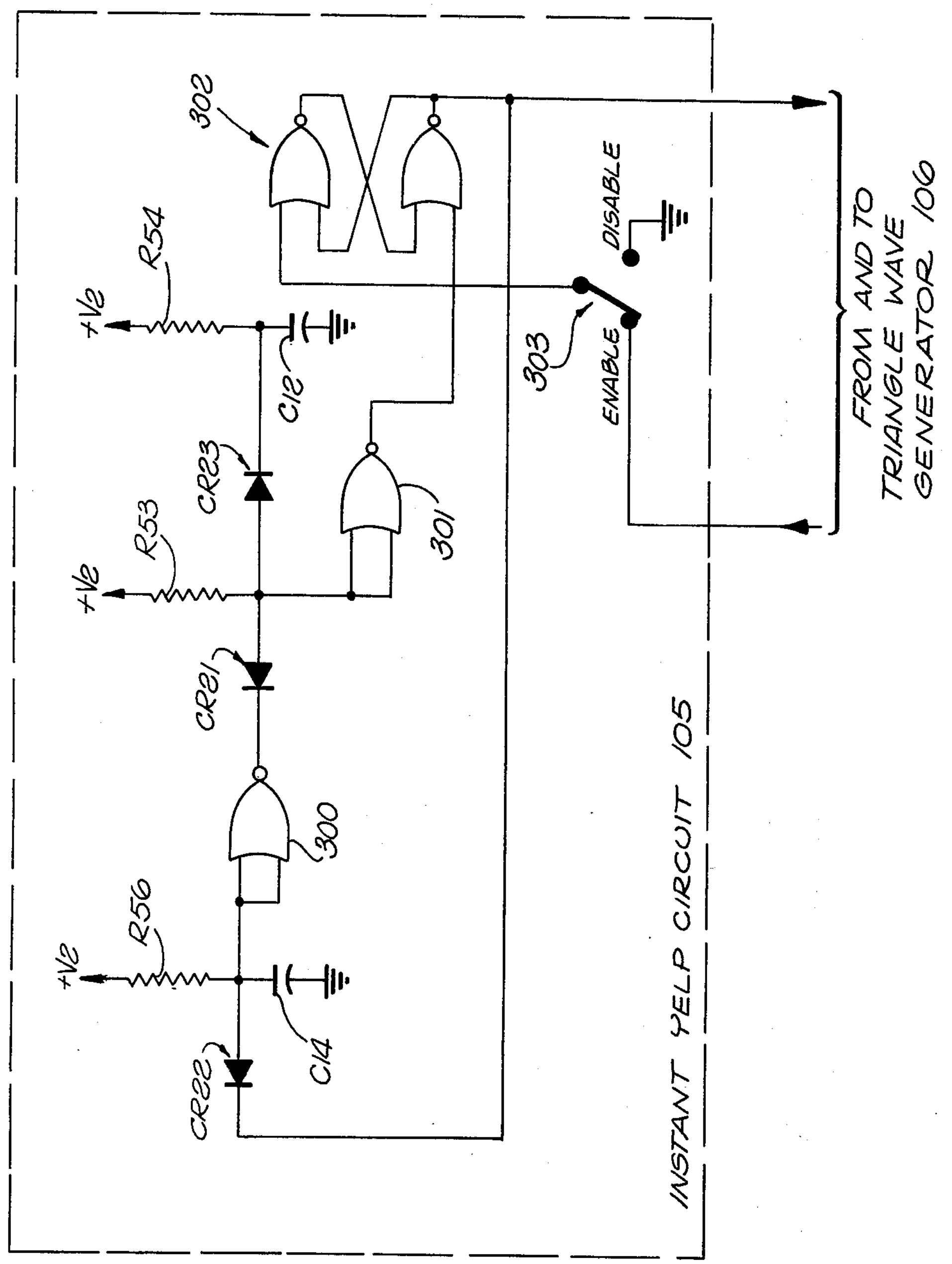
FIG. 3 is a schematic diagram of an instant YELP circuit shown in FIG. 1.

In FIG. 3, switch 303 is the enable or disable switch for this circuit. If 303 is in the enable position, a positive voltage of 12 volts applied to flip-flop 302 will cause this circuit to produce an output from triangle wave generator 106 (FIG. 1) for a duration of approximately 5 seconds. At the end of this 5-second period, the circuit will switch back to its normal condition as long as the input has been removed. If switch 303 is in its disable position, this circuit will not be activated under any input conditions. The timing in this circuit is controlled by resistor R56 and capacitor C14. To insure proper initial conditions upon power turn on, capacitor C12 and resistor R54 are selected so that the circuit is normally reset with no output.

Figure 4:
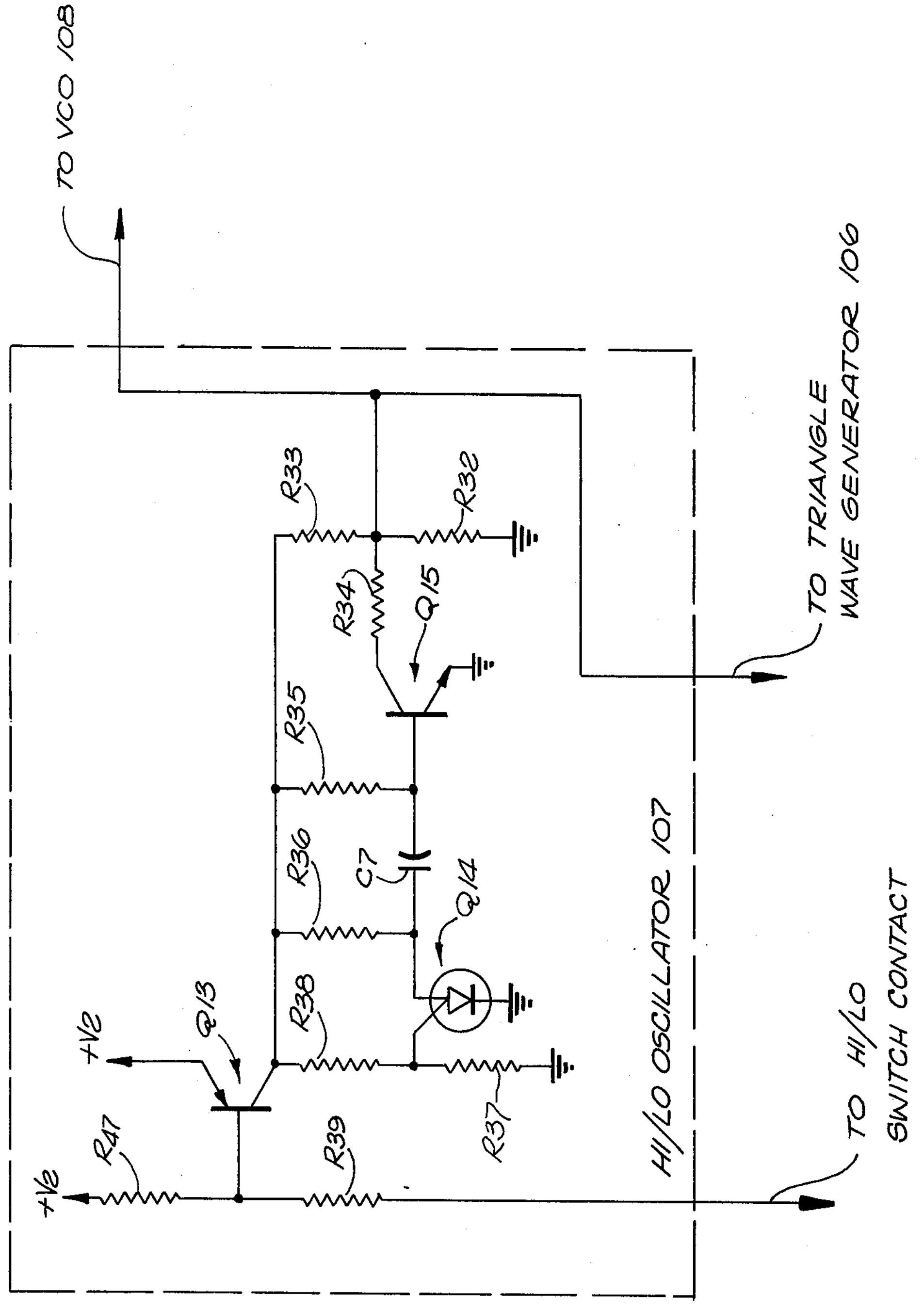
FIG. 4 is a schematic diagram of a HI/LO oscillator shown in FIG. 1.

The HI/LO oscillator shown in FIG. 4 is activated when switch S1 (a load selector switch) is in HI/LO position (FIG. 11). This will turn on transistor Q13 (FIG. 4) which applies a voltage to the PUT Q14. The timing of resistors R36, R35 and capacitor C7 has been selected in such a manner to insure an approximate 50 percent duty cycle or a ½-second per half period output of two different voltage levels from resistors R33, R32 and R34 applied to the VCO 108. These two output voltages are provided through the action of the PUT Q14 turning on and off transistor Q15 which will parallel R34 with R32, thus providing the alternate voltage level outputs.

Figure 5:
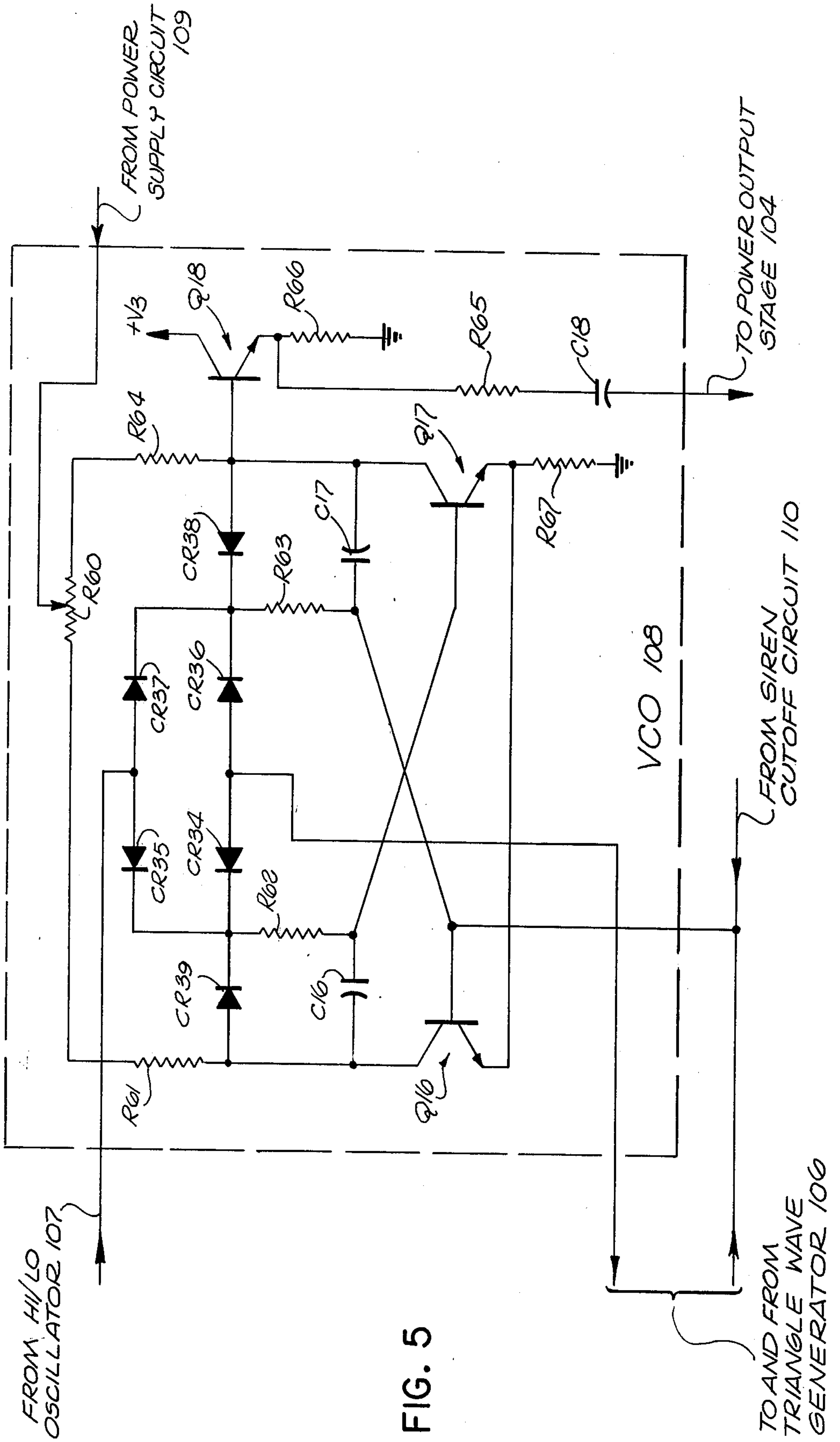
FIG. 5 is a schematic diagram of a voltage controlled oscillator (VCO) shown in FIG. 1.

The fourth functional block is called the Voltage Controlled Oscillator, or VCO. The VCO 108 (FIG. 5) comprises a standard cross-coupled multivibrator. An input voltage is applied between diode CR35 and CR37 or between diodes CR34 and CR36. This voltage directly controls the output frequency at which this multivibrator operates. Any variations in the various components on either side of this multivibrator can be corrected by a symmetry adjustment of the potentiometer R60 which is in the collectors of Q16 and Q17. Diodes CR39 and CR38 insure that the multivibrator will always start when a voltage is applied to it. The output of the multivibrator is taken from resistor R64 through a common emitter transistor buffer Q18. This prevents any loading of the output circuit back into the VCO 108. The VCO 108 can be disabled by grounding the base of transistor Q16.

In FIG. 6, the function is to provide decoupling from the input power of the vehicle to the various parts of the siren circuitry. The three voltages developed are V1, V2 and V3. Voltage V1 is applied to all of the microphone input circuitry. In addition, it is also applied to the radio input circuitry. Voltage V2 is the voltage that is normally applied to all of the siren generating blocks. Voltage V3 is applied to the power output stage driver section. By dividing the input voltage into these three separate voltages, all interaction between various functional blocks has been eliminated. Transistor Q27 acts as a switch and is turned on whenever R87 or R86 is returned to ground. This allows voltage V1 to be applied to the microphone input circuitry and to the radio input circuitry.

In FIG. 9, the purpose is to allow the emergency vehicle operator to deactivate the siren by opening a door opening switch 205. Under normal operating conditions, a ground signal will be applied to P3-9 thus allowing the VCO 108 to operate properly. If this signal is removed, transistor Q19 will turn on, thus grounding the base of Q16 (FIG. 5) through diode CR32 (FIG. 9). The VCO 108 will then cease to function.

Figure 8:
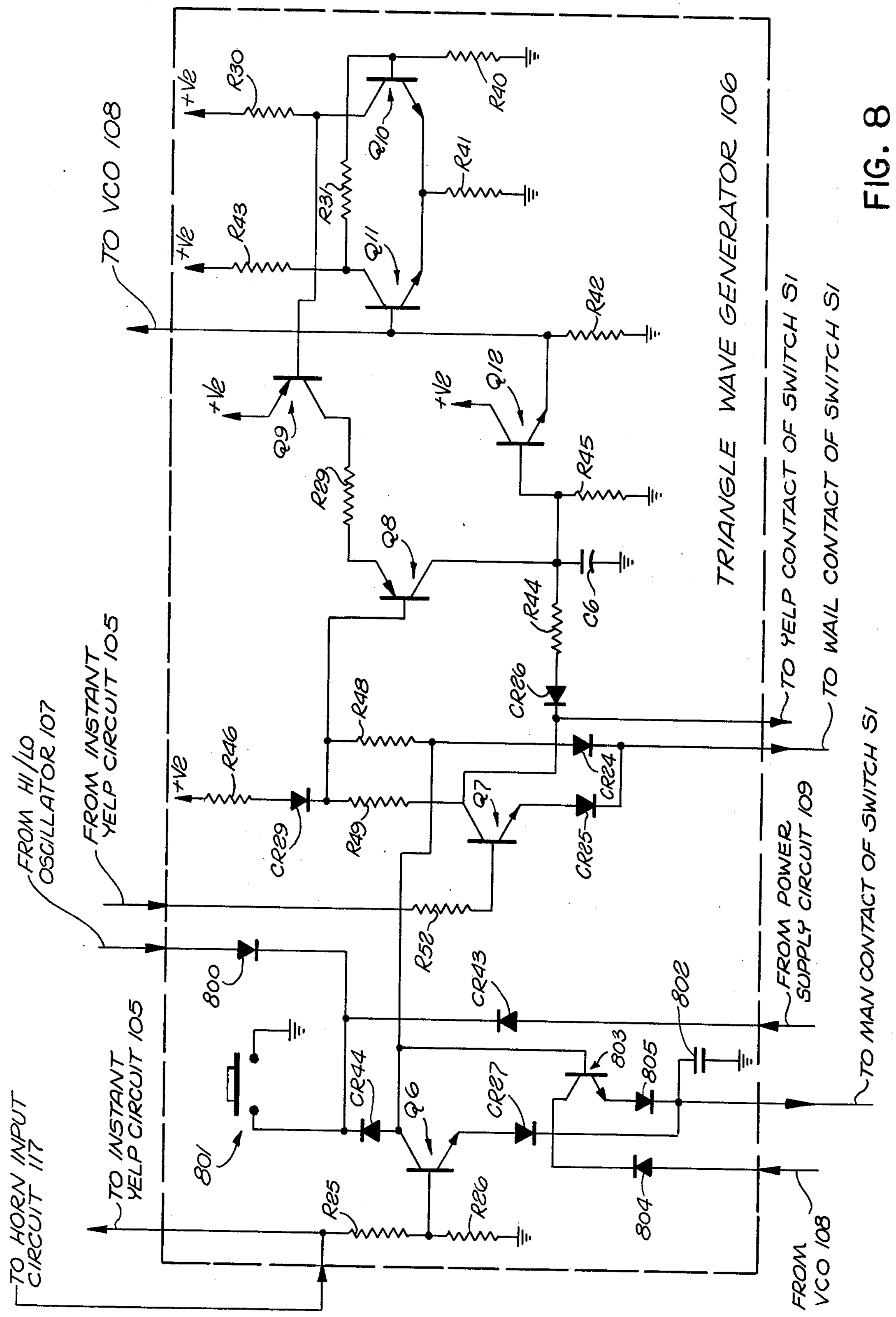
FIG. 8 is a schematic diagram of a triangle wave generator shown in FIG. 1.

The purpose of triangle wave generator 106 is to generate waveforms which, applied to the VCO 108, will vary the VCO 108 through its frequency range, thus producing the sounds conventionally called wail and yelp. This is developed through the use of a single timing capacitor C6 (FIG. 8). The capacitor C6 is alternately charged and discharged through the action of a Schmitt trigger which includes transistors Q11, Q10 and resistors R43, R30, R31, R41 and R40. The alternate switching action of this Schmitt trigger turns on and off transistor Q9 which applies a current through resistor R29 and transistor Q8 to charge capacitor C6. When the Schmitt trigger turns off, C6 discharges through various combinations of resistors such as R44 and R45. The rate of charge through this current source transistor Q8 is determined by a combination of resistors and diodes in its base such as R46, diode CR29, resistors R49, R48, depending on the setting of mode selector switch S1. Diode CR29, in the base of this circuit, tends to stabilize transistor Q8 over temperature. The output of this circuit is applied to the VCO 108 through the buffer transistor Q12. The various cycle rates can be easily adjusted in this circuit by varying the various base resistors that control the drive to transistor Q8. When the selector switch S1 is in the YELP position, the following resistors control the charge of capacitor C6: R46 and R49 control the charge while resistors R44 and R45 in parallel control the discharge. When selector switch S1 is in the WAIL position, the following resistors control the charge rate: R46 and R48. The following resistor controls the discharge rate: R45. If switch 303 in the instant YELP circuit is enabled and a horn-input signal is applied to P3-4, transistor Q7 (FIG. 8) will be turned on if selector switch S1 is in the WAIL position. When this happens, the unit will switch from wail to instant YELP for the duration of the period that the instant yelp circuit is activated. This is approximately 5 seconds. If the mode selector switch is in the manual position and a horn input is applied, transistor Q6 will turn on. This action will cause the cycling to occur, which gives the wail output. If the siren button 801 is depressed, the same action will occur with S1 in the manual position. As soon as switch 801 is released, the wail signal will cease to be emitted through the action of the transistor and diode which ties to the base of Q16 that is located in FIG. 5.

Power output stage 104 may be entirely conventional.

Figure 13:
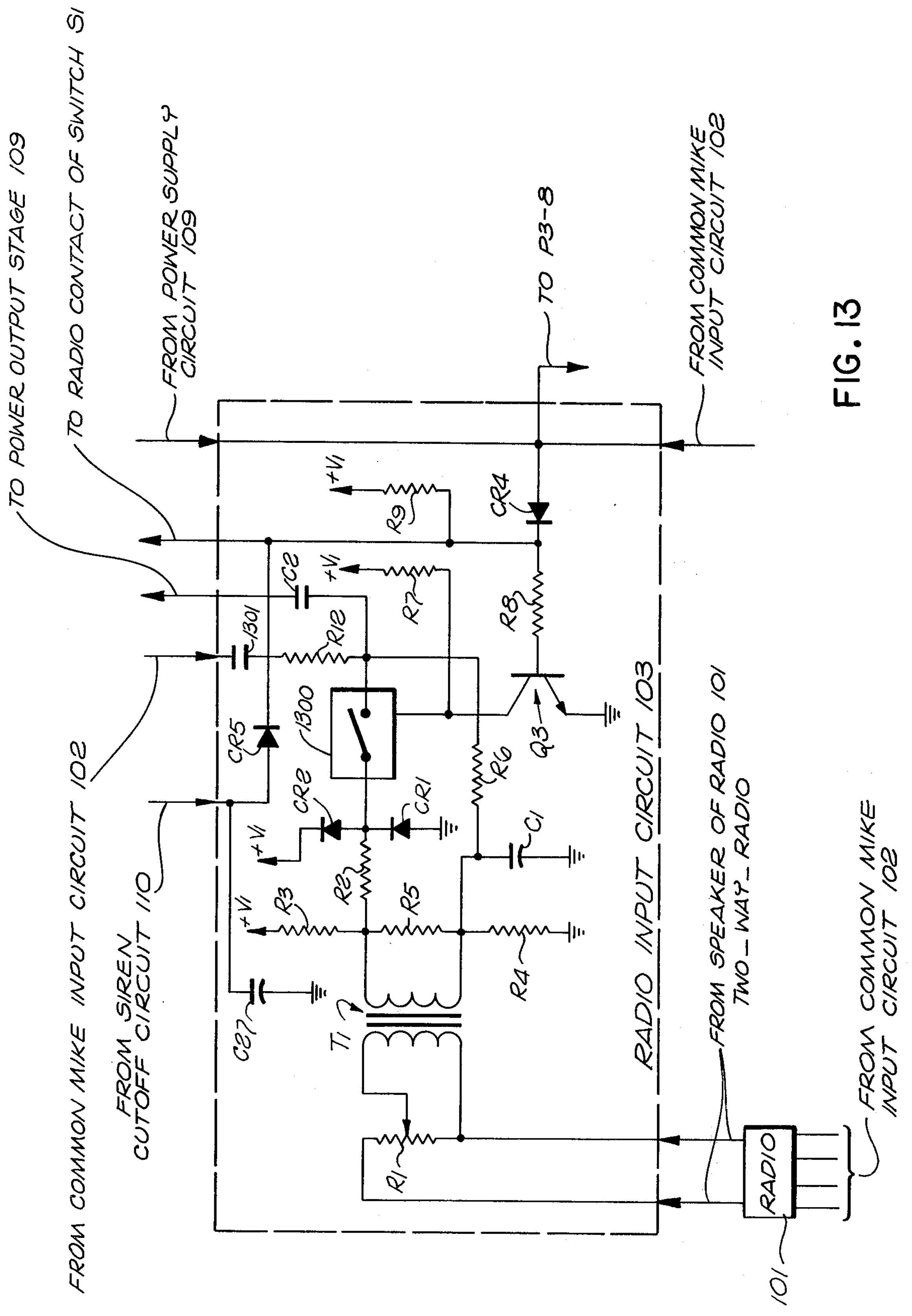
FIG. 13 is a schematic diagram of a radio input circuit shown in FIG. 1.
Figure 14:
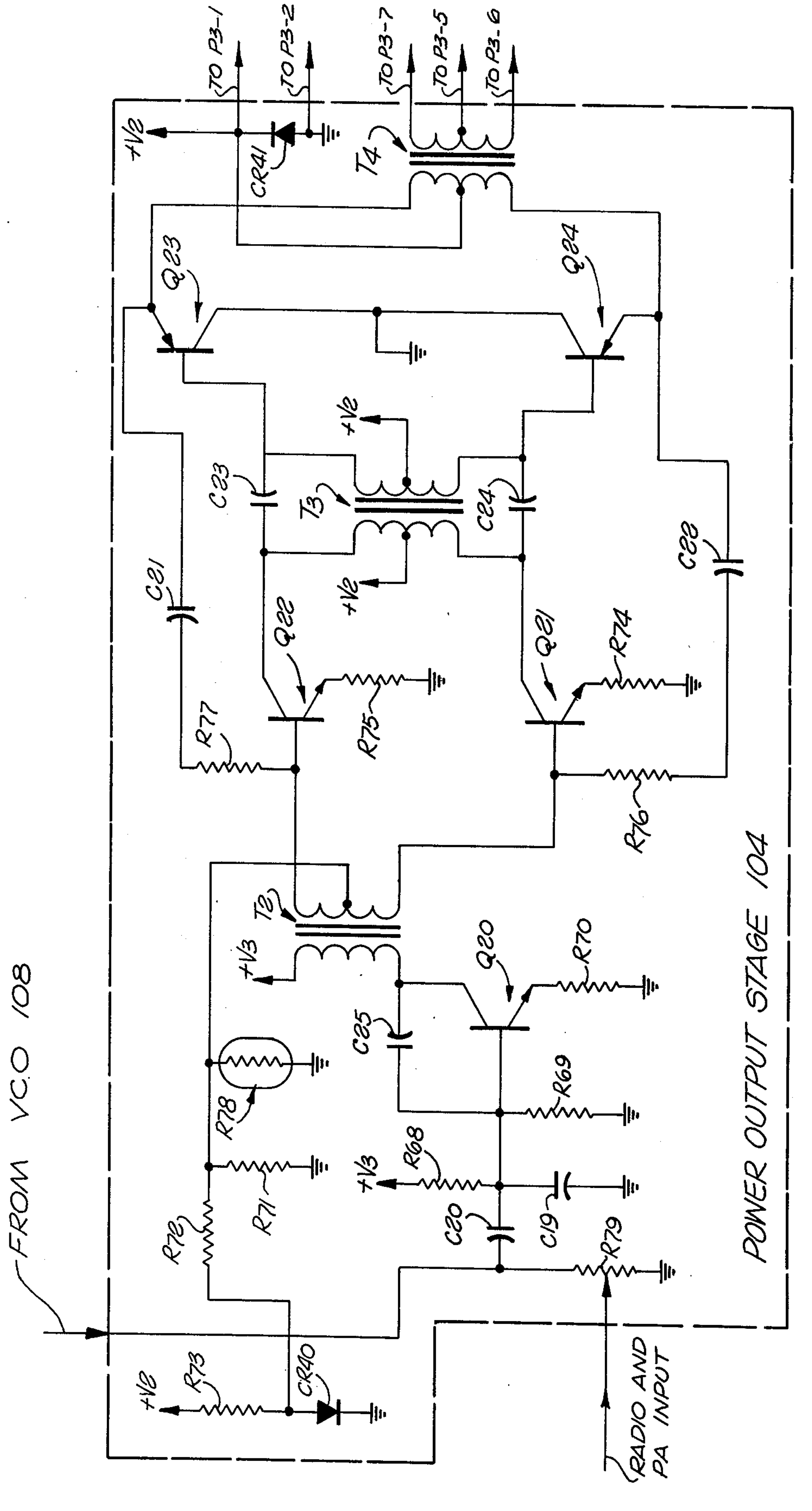
FIG. 14 is a schematic diagram of a power output stage shown in FIG. 1.

The radio input circuit 103 of FIG. 13 permits the signal from the vehicle's two-way radio to be rebroadcast over the outside speaker 115 through the siren system. This signal is brought in through a potentiometer R1, which allows adjustment of the signal level, and through an impedance matching and isolating transformer T1 into the input of a protected electronic switch 1300. The output of this switch is then applied to the power output stage 104. The radio input circuitry is enabled whenever the selector switch S1 is in the RADIO position. This turns off transistor Q3 which applies a positive voltage through R7 to switch 1300, thus turning on switch 1300.

Figure 12:
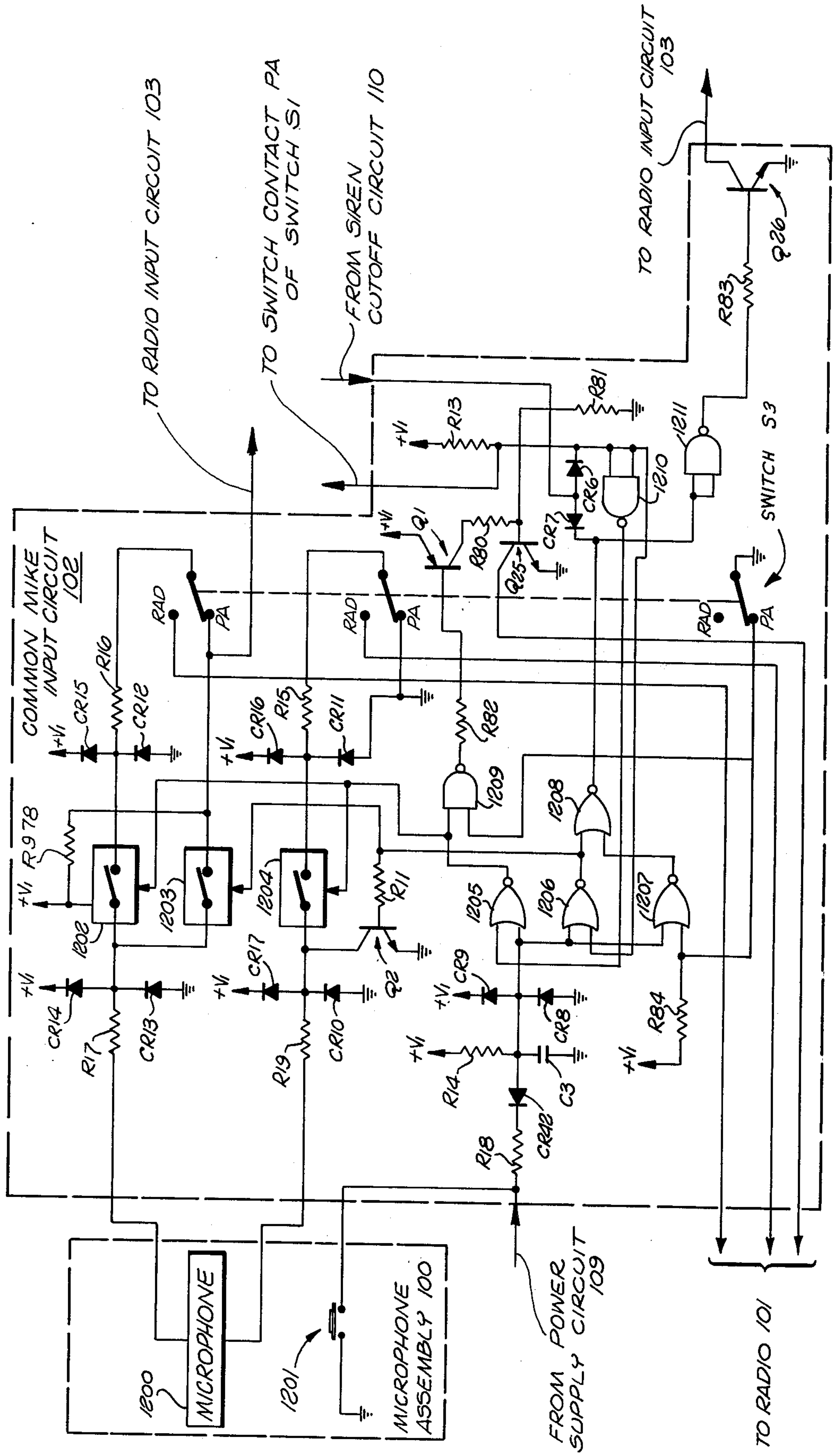
FIG. 12 is a schematic diagram of a common mike input circuit shown in FIG. 1.

The common mike input circuitry in FIG. 12 includes switches 1202, 1203 and 1204 (solid state quad bilateral gates) to switch the various functions of the microphone circuitry into the siren speaker 115 or out to two-way radio 101. The microphone audio high signal is applied to resistor R17. The microphone audio low signal is applied to resistor R19. If switch S3 is in the radio position and selector switch S1 is in any position except PA, the audio high signal applied to resistor R17 will come through resistor R17 into the protected input of 1202, then through 1202 to be applied through S3 to the microphone input of radio 101. The input signal of the microphone low which is applied to radio 101 will come through R19 and through the protected input of 1204 which is applied through switch S3 to the other microphone input of radio 101. This signal, when applied to the two-way radio, makes it unnecessary to have a microphone for radio 101 plus 1200. Each of the electronic switches 1202, 1203, 1204, 1300 is turned on when the microphone button 1201 is keyed according to logic 1205, 1206, 1207, 1208, 1209, 1210, 1211 etc. If the common microphone switch S3 is in the radio position and the mode selector switch S1 is in the PA position, the audio signal applied to resistor R17 will go through quad bilateral gate 1203 through a ten microfarad capacitor 1301 and through resistor R12 (FIG. 13) to the input of the power output stage 104. The use of a quad bilateral switch in the common microphone circuitry is a great improvement over the use of individual switching sections. The use of such devices greatly increases reliability and life through the use of fewer wires and fewer mechanical switch contacts of the system. This trouble-free operation and long life is especially important to the operation of normal emergency vehicles.

OPERATION

When the horn ring is depressed or the foot switch is depressed (203 or 204 in FIG. 2), horn input circuit 117 (FIG. 1) causes the instant yelp circuit 105 to operate the siren in a brief, timed yelp mode.

When switch S1 in FIG. 11 is in the HI/LO position, HI/LO oscillator 107 modulates the output frequency of VCO 108. Switch S1 grounds the cathode of diode CR26 or diodes CR24 and CR25 (FIG. 8) in the respective YELP or WAIL positions of S1. This causes generator 106 to modulate the output frequency of VCO 108 in either one of two ways different from that of HI/LO oscillator 107 and from each other. The MAN position of switch S1 allows manual control by switch 801 and control generator 106 in the WAIL mode.

The HI/LO siren sound is typically used in Europe.

The WAIL siren sound is typically used in the United States.

The YELP siren sound is typically used on board ship in the United States Navy.

The output of microphone 1200 in FIG. 12 takes two pairs of paths when button 1201 is depressed. Either switches 1202 and 1204 are closed, or switch 1203 is closed and transistor Q2 grounds the input of switch 1204. For the ground in the first mode, the middle PA contact of switch S3 is grounded.

One purpose of common mike input circuit 102 is to provide selectively a microphone input, with one microphone, either to radio 101 for radio frequency transmission, or to loudspeaker 115. Two RAD contacts of switch S3 are thus connected to the mike input of radio 101. The radio position of switch S3 is not overridden by any position of switch S1 except the PA position. The RADIO position of switch S3, however, is overridden by the PA position of switch S1.

Note the RADIO position of switch S1 reduces the base potential of transistor Q3 (FIG. 13) and closes switch 1300 to route the audio output of radio 101 to loudspeaker 115.

When switch S3 is in the PA position, switch 1300 is opened and VCO 108 is disabled. This overrides all positions of switch S1 except the PA position.

The purpose of the PA position of the switch S3 is to provide a double-throw switch which can be operated more quickly than the six positions of switch S1, while the PA position of switch S1 can, if conveniently located, be used to override the radio position of switch S3.

In FIG. 12, the output of NOR gate 1205 closes and opens switches 1202 and 1204 together. NOR gate 1206 closes and opens switch 1203, and maintains transistor Q2 at saturation or cutoff together. The logic of NAND gate 1209 turns radio 101 on and off. NOR gate 1208 turns VCO 108 on and off via diode CR7, and switch 1300 (FIG. 13) on and off via diodes CR7 and CR5.

The PA contact of switch S1 turns VCO 108 and switch 1300 on and off via diode CR6, and diodes CR6 and CR5, respectively.

Note will be taken that NOR gates 1205, 1206, 1207 and 1208 provide a logic determined by the potentials of three leads: one from 1201 to R18; one to the PA contact of switch S1; and one from the lowermost PA contact of switch S3.

In the RADIO position of switch S1, electronic switch 1300 is closed to pass the speaker output of radio 101 to the loudspeaker 115.

What is claimed is:

1. A sound communication system, said system comprising: a first switch having a pole and at least first and second contacts for public address (PA) and siren modes of operation, respectively, said first switch pole being maintained at a predetermined potential; a voltage controlled oscillator (VCO) having a signal input, a disable input and an output; first means connected from said first switch second contact to said VCO input to modulate the VCO output frequency; a loudspeaker; second means having an input and an output, said second means input being connected from said VCO output, said second means output being connected to said loudspeaker, said second means causing said loudspeaker to broadcast audio signals of frequencies and amplitudes proportional to those existing at the output of said VCO; a two-way radio having two microphone inputs and two speaker outputs, a second switch having first, second and third ganged poles alternately engageable with corresponding radio contacts and PA contacts; a microphone having first and second leads; first and second electronic switches both connected from said first lead to said first pole and the PA contact thereof, respectively; a third electronic switch connected from said second lead to said second pole; third means connected from said first pole PA contact to said second means for operating said loudspeaker from said microphone in a PA mode; a microphone switch; a radio input circuit including a fourth electronic switch connected from said two radio speaker outputs to said second means input; a logic circuit connected from one of said third pole contacts, from said microphone switch, and from said first switch first contact, corresponding radio contacts of said first and second poles being connected to the microphone inputs of said radio, said first switch first contact being a PA contact, said logic circuit causing said loudspeaker to operate in the said PA mode when one of the poles of either said first or second switches engages a PA contact.

2. The invention as defined in claim 1, wherein said logic circuit disables said VCO and opens said fourth electronic switch when one of said poles engages a PA contact.

3. The invention as defined in claim 2, wherein said logic circuit holds said second electronic switch open and allows said first and third electronic switches to be closed and opened together with said microphone switch when said first switch pole is out of engagement with said PA contact thereof, and allows said second electronic switch to be closed and opened with said microphone switch and holds said first and third electronic switches always being open when said first switch PA contact is engaged by the pole thereof.

4. The invention as defined in claim 3, wherein said logic circuit also disables said VCO and opens said fourth switch whenever all of said PA contacts are engaged by the corresponding poles thereof.

* * * * *